US006841107B2

(12) United States Patent
Peters et al.

(10) Patent No.: US 6,841,107 B2
(45) Date of Patent: Jan. 11, 2005

(54) METHOD OF MANUFACTURING MULTIPLE LEVELS OF AUTOMOBILE TRIM

(75) Inventors: Arnis E. Peters, Onalaska, WI (US); Dan Weinstock, La Crescent, MN (US); Kevin J. Rink, Onalaska, WI (US)

(73) Assignee: Northern Engraving Corp., Sparta, WI (US)

(*) Notice: Subject to any disclaimer, the term of this patent is extended or adjusted under 35 U.S.C. 154(b) by 0 days.

(21) Appl. No.: 10/288,068

(22) Filed: Nov. 5, 2002

(65) Prior Publication Data

US 2003/0087075 A1 May 8, 2003

Related U.S. Application Data

(60) Provisional application No. 60/332,769, filed on Nov. 6, 2001.

(51) Int. Cl.[7] .......................... B29C 45/14; B29C 70/78
(52) U.S. Cl. ...................... 264/135; 264/132; 264/134; 264/250; 264/257; 264/265; 264/267; 264/275
(58) Field of Search ................................ 264/132, 134, 264/135, 250, 254, 257, 259, 263, 265, 266, 267, 271.1, 275, 294, 296; 428/545, 577, 98, 195.1

(56) References Cited

U.S. PATENT DOCUMENTS

| 4,734,230 A | * | 3/1988 | Rhodes et al. | 264/46.4 |
|---|---|---|---|---|
| 4,923,539 A | * | 5/1990 | Spengler et al. | 156/79 |
| 5,133,912 A | * | 7/1992 | Hagiwara et al. | 264/46.4 |
| 5,411,688 A | * | 5/1995 | Morrison et al. | 264/45.4 |
| 5,824,251 A | * | 10/1998 | Morrison et al. | 264/259 |
| 5,919,324 A | * | 7/1999 | Moffitt et al. | 156/79 |
| 5,925,847 A | | 7/1999 | Rademacher et al. | |
| 6,391,232 B1 | * | 5/2002 | Fritsch | 264/46.6 |
| 6,422,640 B2 | * | 7/2002 | Whitehead et al. | 296/146.7 |
| 6,447,706 B1 | * | 9/2002 | Savonuzzi | 264/266 |
| 6,464,917 B1 | * | 10/2002 | Piec et al. | 264/161 |
| 6,479,006 B1 | * | 11/2002 | Kaufmann | 264/275 |

FOREIGN PATENT DOCUMENTS

| EP | 0 376 010 | 7/1990 |
|---|---|---|
| EP | 0 607 968 | 7/1994 |
| EP | 0 936 044 | 8/1999 |
| EP | 1 044 779 | 10/2000 |
| GB | 2 027 636 | 2/1980 |
| JP | 57 140114 | 8/1982 |

OTHER PUBLICATIONS

Yang et al., "Injection Molding of Ribbed Plastic Plates with a Superplastic Zn–22% Al Sheet", *Advances in Polymer Technology*, pp. 216–225 (2001).

Giebauf, et al., "Thin and Also Decorative", KU *Kunststoffe*, vol. 92, pp. 54–58 (1992) (Translation enclosed).

Knoblauch, et al. "Insert Molding Creates the Perforation", *Fraunnhofer–Innstitut fur Chemische Technologie, Pfinztal*, vol. 44, pp. 40–41 (Translation enclosed).

Hella, "Optimales Klima durch Vollautomatisches Regel-system", *ATZ Automobiltechnische Zeitschrift*, vol. 100, p. 879 (Translation enclosed).

Mishcke, et al. "Back–injection of textiles, carpets and foils", *Kinstoffe/Plastics*, pp. 199–203 (1991).

\* cited by examiner

*Primary Examiner*—Angela Ortiz
(74) *Attorney, Agent, or Firm*—McDonnell Boehnen Hulbert & Berghoff LLP

(57) ABSTRACT

A method for using a single injection molding apparatus to manufacture at least two and up to four different levels of automobile trim pieces as well as automobile trim level pieces manufactured by the methods of this invention.

12 Claims, 9 Drawing Sheets

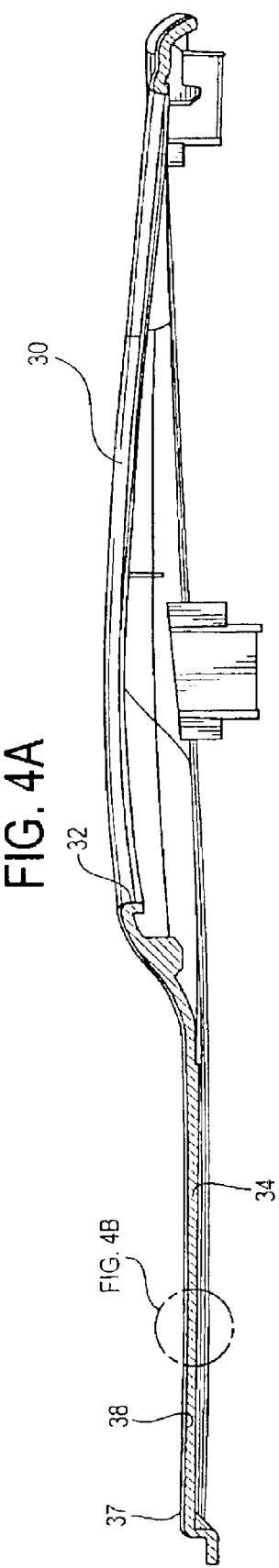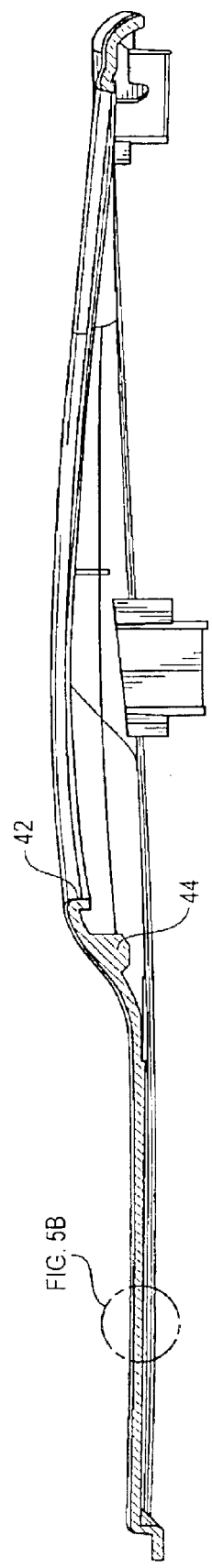

METHOD OF MANUFACTURING MULTIPLE LEVELS OF AUTOMOBILE TRIM

BACKGROUND OF THE INVENTION (1) Field of the Invention

This invention concerns a method for using the same injection molding apparatus to manufacture at least two and up to four different levels of automobile trim pieces. This invention also concerns a strong third trim level piece that is comprised of a thin decorative metal layer and a thin resin layer. This invention further includes trim level pieces manufactured from a stable injected molding resin. Another aspect of this invention are molded plastic and metal parts that include a through feature on their face through which a transparent, semitransparent or opaque resin or plastic is injected.

(2) Description of the Art

Automobiles include various "trim levels" depending primarily upon the cost and luxury level of the automobile in which the trim is being installed. The trim pieces are interior and exterior trim features and molding that are applied to the automobiles in various locations such as dashboards, door handle trim, glove compartment trim, console trim and so forth. The first and lowest trim level is typically painted molded resin trim pieces. A second trim level consists of a pre-formed polymer skin to which a resin backing is applied to give the pre-decorated skin structural integrity. A third trim level consists of decorated metal sheets that are preformed and then united with a premolded resin backing. The fourth and highest trim level consists of real laminated wood to which is applied a metal or pre-molded resin backing.

Each trim level piece includes tabs, connectors, an adhesive on the backing or some equivalent means for attaching each trim level piece to an automobile structure.

Presently, each level type of trim piece is manufactured using different processes, machines and molding apparatuses. This means that tools, dies, stamping machines, injection molds and so forth must be individually purchased to manufacture each piece for each trim level. Further, employees must be hired to manufacture the various trim level pieces, and each trim level piece must be separately designed and engineered. All of this equipment and labor increases the cost to manufacture each trim level trim piece.

Moreover some of the trim levels pieces require post molding manufacturing steps. For example third trim level pieces are made by uniting a premolded resin backing with a prestamped decorative metal piece. After the parts are united, further stamping and crimping steps are required to secure the decorative metal piece to the resin backing. These manufacturing steps also add significant costs to each manufactured trim piece.

There is a need therefore to reduce the design, machining and manufacturing costs of automobile trim level pieces. Furthermore, there is a need to produce third trim pieces that use significantly less materials.

SUMMARY OF THE INVENTION

It is an object of this invention to provide a method for manufacturing at least two and preferably three or four levels of automobile trim pieces using the same injection molding apparatus. The methods of this invention significantly reduce the tooling cost and labor associated with the production of automobile trim level.

It is another object of this invention to provide third trim level pieces including a decorative metal surface and a resin backing that is manufactured of very thin layers of material.

Yet another object of this invention is a plastic or metal part including through features that are filled with a transparent or semi-transparent or opaque plastic or resin.

One aspect of this invention includes methods for manufacturing at least two types of trim level pieces using the same injection mold. The method includes the steps of: (a) preparing a mold having a first piece including a first surface, a second piece including a second surface, and at least one injection port located in the second piece wherein the injection port has an outlet associated with the second surface wherein the mold first piece and second piece unite to form an internal cavity; and (b) manufacturing at least two different trim level pieces using the mold. The trim level piece are selected from the group including; (i) a first trim level piece prepared by injecting a resin into the mold and thereafter removing the cured first level trim piece from the mold and painting at least one surface of the molded trim piece; (ii) a second trim level piece that is prepared by the further steps comprising: preparing a preformed skin having a (decorated) first surface and a second surface wherein the preformed skin first surface has a shape complementary to the mold first surface; placing the preformed skin into the mold such that the preformed skin first surface contacts the mold first surface; closing the mold and injecting resin into the mold through the at least one injection port and into contact with the preformed piece second surface until the internal cavity is filled with resin to form a second trim level piece; and removing the second trim level piece from the mold; (iii) a third trim level trim piece that is prepared by the further steps comprising: preparing a predecorated shaped metal piece from flat metal stock wherein the shaped metal piece has a first surface and a second surface and wherein the shaped metal piece first surface has a shape complementary to the shape of the mold first surface; placing the shaped metal piece into the mold such that the metal sheet first surface is in "contact" with the mold first surface; closing the mold and injecting resin into the mold through the at least one injection port until the mold cavity is "filled with resin" to form a third trim level piece; and removing the third trim level piece from the mold; and (iv) a fourth trim level piece that is prepared by the further steps comprising; preparing a wooden trim piece having a first surface and a second surface wherein the wooden trim piece first surface has a shape that is complementary to the shape of the mold first surface; placing the wooden trim piece into the mold such that the wooden trim piece first surface is in contact with the mold first surface; closing the mold and injecting a resin into the mold through the at least one injection port and into contact with the wood trim piece second surface until the mold cavity is filled with resin to form a forth trim level piece; and removing the fourth trim level piece from the mold.

Another aspect of this invention includes decorative automobile trim piece comprising: a formed metal sheet having decorated first surface and a second surface wherein the metal sheet has a thickness of no greater than about 0.025 inches; and a resin layer applied to the formed metal sheet second surface wherein the resin layer has a thickness of no greater than 2.5 mm.

Yet another aspect of this invention is a second trim level piece that is prepared by the further steps comprising: adhesively laminating cloth to a plastic skin and then performing the cloth covered plastic skin to form a pre-formed skin having a cloth covered first surface wherein the preformed skin first surface has a shape complementary to a mold first surface; placing the preformed skin into a mold so that the preformed skin first surface contacts the mold first surface; closing the mold and injecting resin into the mold through at least one injection port and into contact with a second surface of the preformed skin until the mold internal cavity is filled with resin to form a second trim level piece; and removing the second trim level piece from the mold.

Still another aspect of this invention is a trim level piece comprising an insert having at least one through hole and further including a decorative surface, and a backing; a resin backing associated with the insert backing; and at least on resin feature located on the insert decorative surface.

DESCRIPTION OF THE FIGURES

FIG. 4A is a third level trim piece manufactured by the methods of this invention;

FIG. 4B is a blow-up view of a cross section of the third level trim piece of FIG. 4A;

FIG. 5A is a fourth level trim piece manufactured by the methods of this invention;

FIG. 5B is a blow-up view of a cross section of the fourth trim level piece of FIG. 5A;

DESCRIPTION OF THE CURRENT EMBODIMENT

The present invention relates to methods for using the same resin injection molding equipment to manufacture multiple automobile trim level pieces. In another aspect of this invention is a third trim piece level including a very thin metal layer and a very thin resin layer that has good strength and that is highly dent-resistant.

By "multiple automobile trim levels pieces," it is meant that an injection mold having the same cavity dimensions is used in the process of this invention to manufacture at least two, preferably three and most preferably four different levels of automobile trim pieces. Preferably, the same mold is used to manufacture at least two and preferably three or more levels of automobile trim pieces.

In the specification and claims certain mold inserts will be described as being in "contact" with the mold cavity surface. The word contact is used in its broadest sense to mean that the insert is associated with the mold surface in a manner that inhibits resin from contacting the surface of the insert that is associated with the mold surface except in situations where the insert includes a through hole that expressly allows resin to flow between the insert and the mold cavity wall.

Figure 1:
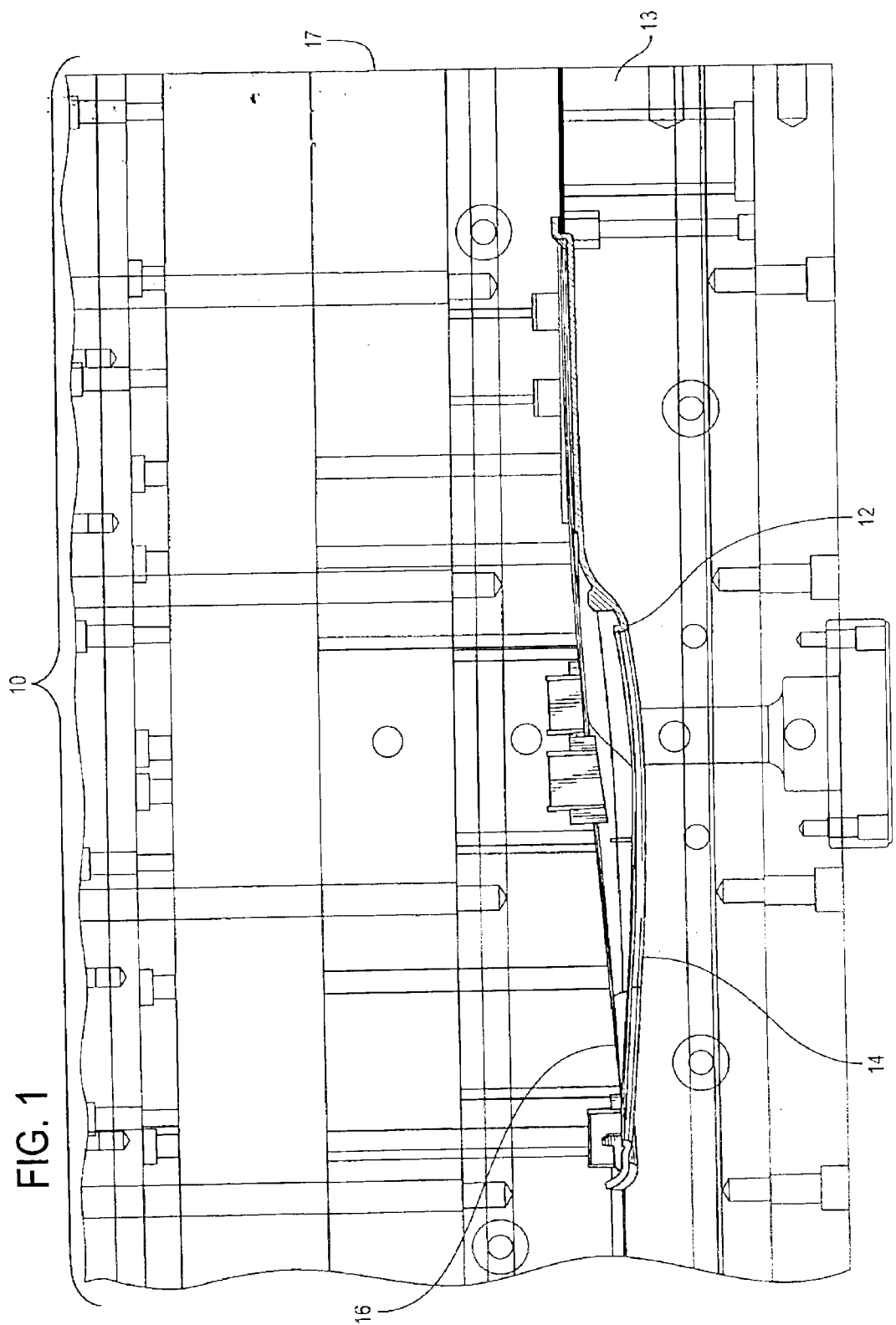
FIG. 1 is a cross-section of a mold useful in the methods of this invention including a mold cavity (14)

The four levels of automobile trim that are manufactured using a single injection mold by the methods of this invention are described below as "first trim level pieces," "second trim level pieces," "third trim level pieces," and "fourth trim level pieces." Each of the trim level pieces is manufactured using an injection mold such as the injection mold of FIG. 1. Injection mold 10 of FIG. 1 includes a first piece 13 including a first surface 12 associated with cavity 14 and a second piece 17 including a second surface 16. Injection mold 10 further includes at least one and preferably a plurality of resin injection ports 19. When mold first piece 13 is united with mold second piece 17, a cavity 14, in the shape of a desired trim level piece is formed.

First Trim Level Pieces

Figure 2:
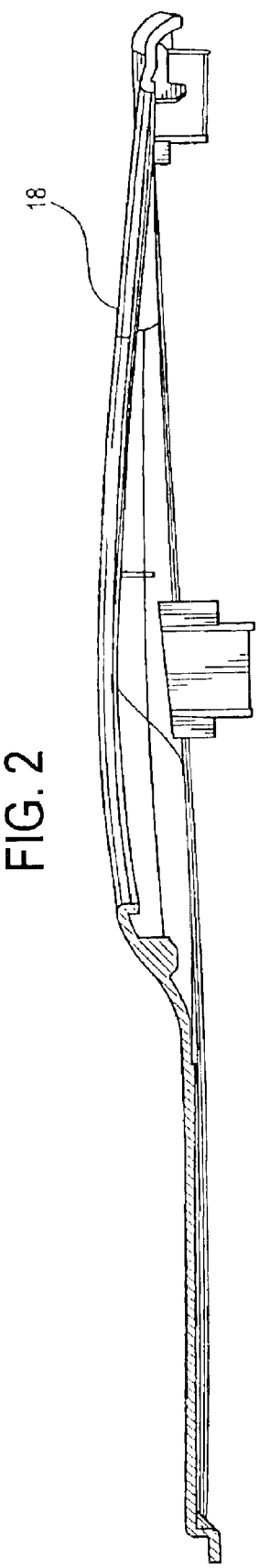
FIG. 2 is a first level trim piece manufactured by the methods of this invention.

First trim level piece 18, shown in FIG. 2 is made of an injected molded resin that may be painted or unpainted. First trim level piece 18 is manufactured by injecting a molten resin into injection mold cavity 14 and thereafter removing the molded part from injection mold 10 once the part is sufficiently cooled. Thereafter, first trim level piece 18 may be painted or may remain unpainted to form a first level trim piece 18. First trim level piece 18 will generally be made entirely of resin and will have a thickness ranging from about 0.040 to about 0.156 inches.

Second Trim Level Pieces

Figure 3:
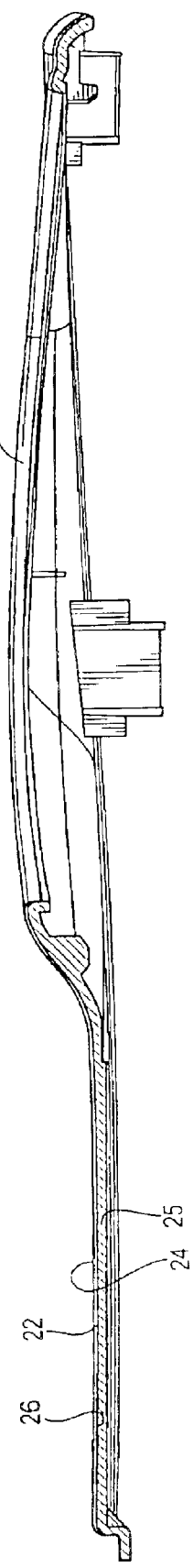
FIG. 3 is a second level trim piece manufactured by the methods of this invention.
Figure 6:
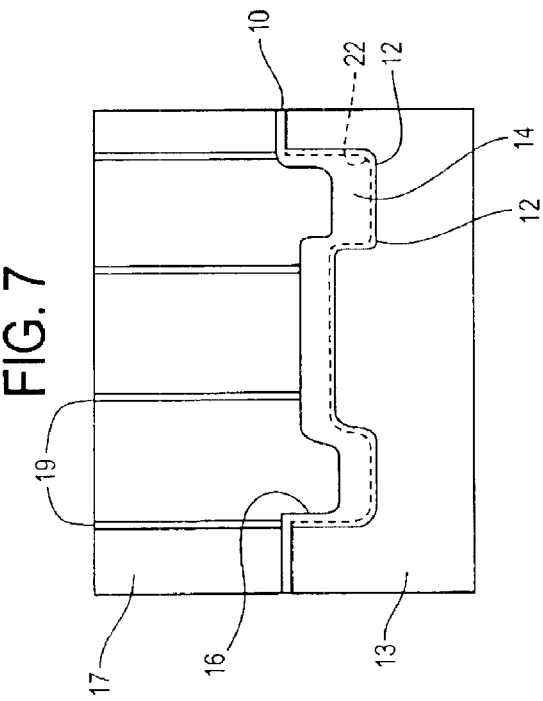
FIGS. 6, 7, 8 and 9 are a cross-section views of a mold of this invention holding first, second, third and fourth level trim pieces.
Figure 7:
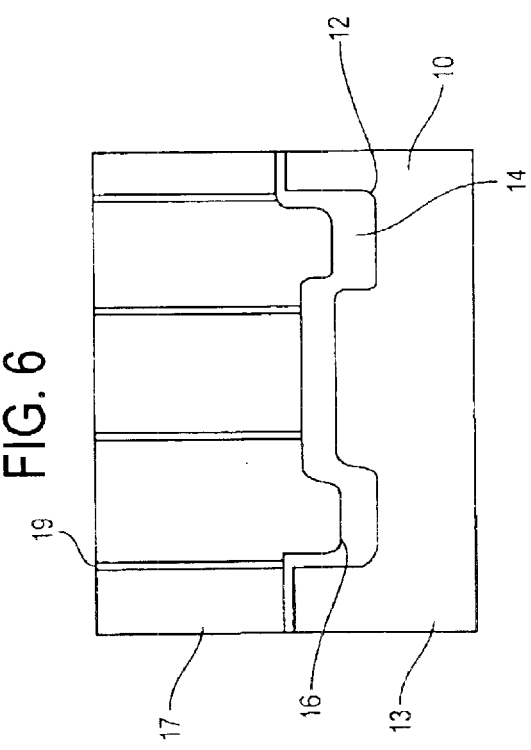
Figure 8:
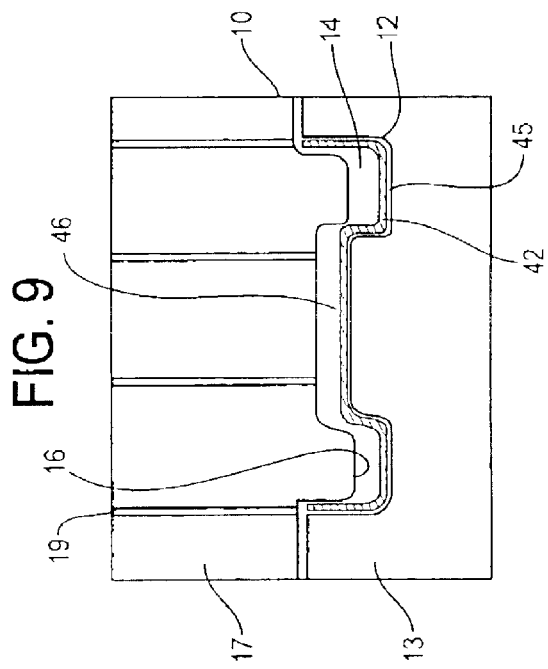

A second trim level piece 20 is shown in FIG. 3. Second trim level piece 20 comprises a preformed skin 22 that is colored, decorated, or that is a laminate. Preformed skin 22 is typically preformed by thermalforming. In one optional embodiment, preformed skin 22 is a laminate of a cloth layer and a plastic skin layer. In this embodiment, a piece of cloth is adhesively laminated to a plastic skin and the laminated cloth covered plastic piece is formed into preformed skin 22. In this alternative embodiment, the cloth may be located on preformed skin first surface 24 or second surface 26.

Preformed skin 22 has a first surface 24 and a second surface 26. The skin first surface 24 is complementary to a first surface 12 of injection mold 10. Second trim level piece 20 is manufactured by placing preformed skin piece 22 into mold cavity 14 such that first surface 24 of the precoated preformed skin rests against the first surface 12 of injection mold cavity 14. Next, a resin is injected into the mold such that the resin enters the mold through mold second surface 16, fills cavity 14, and becomes adhered to the second surface 26 of preformed skin 22 to form a second trim level piece 20. After cooling, second trim level piece 20 including preformed skin 22 and resin layer 25 is removed from injection mold 10. The second trim level piece will have a total thickness of from about 0.040" to about 0.156" with the plastic inmolded preformed skin 22 having a thickness of from about 0.008 to about 0.030 inches.

Third Trim Level Pieces

A third trim level piece 30, shown in FIGS. 4A and 4B includes a pre-shaped metal piece 32 and a resin backing layer 34. A close up cross-section view of third trim level piece 30 in FIG. 4B shows that third trim level piece 30 further includes an adhesive 36 located between pre-shaped metal piece 32 and the resin backing 34. Third trim level piece 30 is manufactured by first shaping a sheet of metal having a thickness of from about 0.005 to about 0.025 inches, and preferably a sheet of aluminum that is decorated on one surface in stamping and die cutting processes to produce pre-shaped metal piece 32 having a first surface 37 and a second surface 38. First surface 37 will have a shape that is complimentary to the shape of the first surface 12 of mold 10.

Prior to or following shaping of pre-shaped metal piece 32, an adhesive material is applied in a thin layer to the second surface 38 of the metal sheet or pre-shaped metal piece 32. The adhesive layer will have a thickness sufficient to bind the resin to pre-shaped metal piece 32. The purpose of the adhesive is to aid in bonding the resin to a pre-shaped metal piece 32. Useful adhesives include thermoplastic adhesives and thermoset adhesives with thermoset adhesives such as acrylics, polyeurethanes and combinations thereof being preferred. A preferred adhesive is a hot melt adhesive such as Ashland Prelam manufactured by Ashland Chemical.

Shaped metal piece 32 is then placed in mold cavity 14 such that shaped metal piece first surface 37 abuts first surface 12 of mold cavity 14. The mold is closed and resin is injected into the mold and against second surface 38 of shaped metal piece 32. During resin injection, the adhesive layer facilitates the bonding of the resin to second surface 38 of shaped metal piece 32 to form a third trim level piece 30 including a resin backing 34. After cooling, the third trim level piece 30 is removed from mold 10. Third trim level piece 30 will have a total thickness of from about 0.040 to about 0.156 inches.

Fourth Trim Level Pieces

A fourth trim level piece 40 is shown in FIG. 5. Fourth trim level piece 40 includes a decorative wooden piece 42 and a resin backing 44. Fourth trim level piece 40 is manufactured by first preparing decorative wooden piece 42 having a first surface 45 and a second surface 46 as shown in FIG. 5B. Decorative wooden piece first surface 45 is complimentary in shape to the shaped first surface 12 of mold cavity 14. Decorative wooden piece 42 typically consists of one or more layers of wood with a very thin wooden veneer on exposed first surface 45. The wood veneer surface is typically covered with one or more layers of a protective polymer coating such as a urethane, polyester, or acrylic coating.

Fourth trim level piece 40 is manufactured by placing decorative wooden piece 42 into mold cavity 14 so that the decorative wooden piece first surface 45 is complimentary to and abuts mold cavity first surface 12. Mold 10 is closed and resin is injected into the mold whereupon the resin adheres to the second surface 46 of decorative wooden piece 42. The second surface 46 of decorative wooden piece 42 may include an adhesive or mechanical structure such as a metal frame or foundation to facilitate the adherence of resin to second surface 46 of decorative wooden piece 42. Fourth trim level piece is removed from mold 10 after the resin has cooled. Fourth level trim piece 40 will have a total thickness of from about 0.040 inches to about 0.156 inches with veneer portion having a thickness of from about 0.008 to about 0.100 inches.

The methods of this invention allow for the manufacture of first, second, third and fourth trim level pieces all having essentially the same overall thickness. Thus, even though the trim pieces may include decorative metal, wood, or preformed plastic layers of varying thickness, the overall trim piece thicknesses are made uniform because the amount of resin that can be added to the piece is limited by the injection mold cavity dimensions which is the same for all trim levels. In addition, the methods of the invention allow for the manufacture of a variety of trim level pieces all including the same installation tabs and construction thereby facilitating the assembly of automobiles with different trim levels using the same assembly techniques.

A benefit of manufacturing third trim level pieces 30 using the methods of this invention is that the resulting third trim level pieces 30 are unexpectedly very strong. Therefore, it is possible to decrease the thickness of the resin and/or metal layers in the third trim level pieces in comparison to prior art metal clad trim level pieces thereby reducing the cost of manufacturing third trim level pieces 30 while maintaining its strength and dent resistant properties. The metal used in third trim level piece may be any metal that is used to manufacture any thin sheet of metal that used to manufacture automobile trim. Examples of useful metals include stainless steel, copper, bronze, aluminum, alloys thereof, nickel and so forth. Further, the exposed metal surface may be burnished or polished to form a decorative metal surface. A preferred metal is aluminum. The metal thickness and preferably aluminum thickness is less than 0.025 inches and even more preferably ranges between 0.012 and 0.018 inches. The resin layer can be as little as 1.0 mm thick and preferably ranges between 1.0 and 2.5 mm in thickness.

The selection of the resin is important in order to maintain the strength of the trim level pieces manufactured according to this invention. It is preferred that the resin material have a coefficient of expansion that is similar if not equal to the coefficient of expansion of the material to which it is associated. Examples of useful resins include, but are not limited to thermoplastic resins such as nylon, polycarbonate, ABS, PC/ABS, and combinations thereof. A preferred resin used in the manufacture of third trim level piece 30 is a glass filled thermoplastic resin such a glass filled nylon or glass filled PC/ABS wherein the resin includes from about 10 to about 30 wt % glass fibers and preferably about 25 wt % glass fibers. A preferred thermoplastic material is a nylon resin manufactured by Bayer and sold under the trade name Durethan BKV-125.

Figure 9:
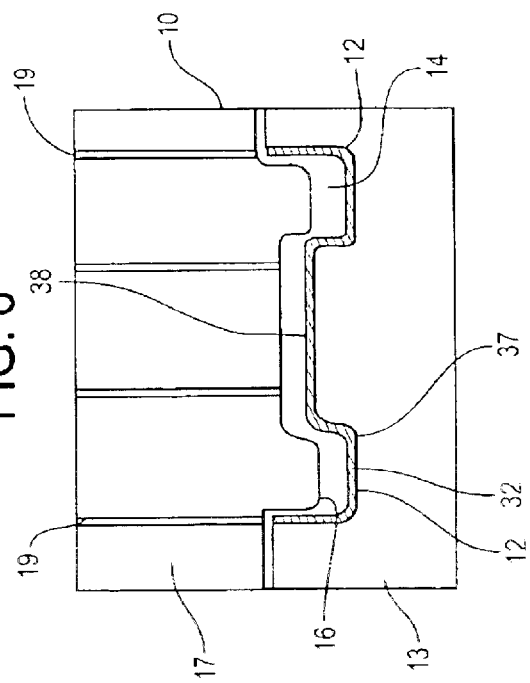
Figure 10A:
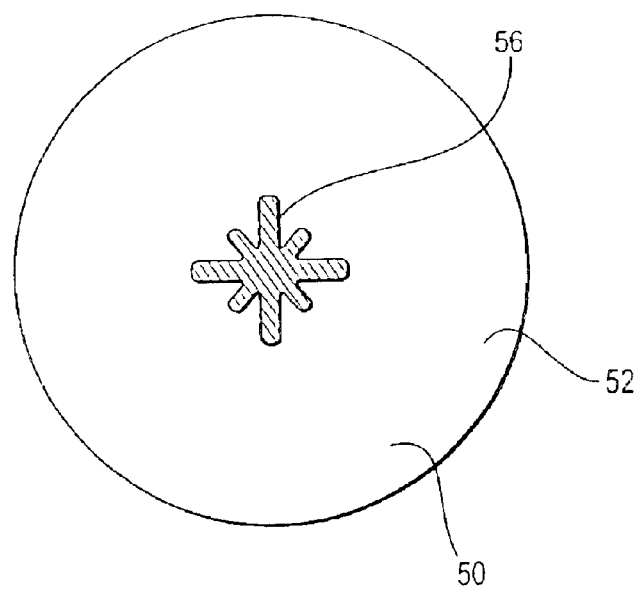
FIGS. 10A and 10B are front and side cutaway views of a metal piece including a through hole in which resin has been injected using methods of this invention.
Figure 10B:
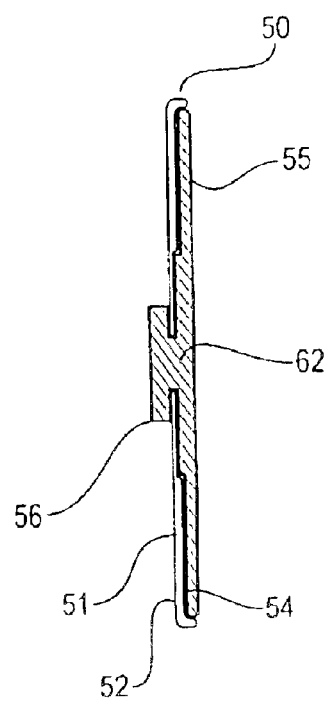

The methods of this invention use standard injection molding processes and techniques to manufacture the trim level pieces of this invention. FIGS. 6–10 are side cross section views a of a mold 10 that is used to manufacture a first trim level piece (FIG. 6), a second trim level piece (FIG. 7), a third trim level piece (FIG. 8), and a fourth trim level piece (FIG. 9). In FIGS. 6–9, injection mold 10 is typically a two-piece mold that includes a first piece 13 having a first surface 12 and a second piece 17 having a second surface 16. Mold 10 further includes at least one and preferably a plurality of resin injection ports 19 in second piece 17 that unite the outside of second piece 17 with second surface 16.

In addition to the trim level pieces described above, the methods of invention are useful for manufacturing automobile buttons, switches, knob covers and so forth that may optionally include a through hole as a resin feature associated with the exposed surface of the trim level piece. An example of such a trim level piece is shown, is side and front view in FIGS. 10A and 10B. The button 50 shown in FIGS. 10A and 10B includes an insert 51 that includes a decorative surface 52, a backing 54 and a through hole 62. When the insert is placed in injection mold 10, resin 55 is applied to backing 54 but some of the resin passes through hole 62 and fills a feature in the mold having a shape corresponding to decorative resin feature 56 of button 50. Buttons and trim pieces including a variety of decorative resin features can be made according to the methods of this invention. Decorative resin features can include designs, words, emblems, and they can be made using opaque, transparent, and semi-transparent resins that have any color.

Another aspect of this invention is, therefore, a resin is injected into a through hole in a substrate to form a design on the surface of the substrate or a design that can be back-lit. Referring to FIGS. 11A–11C, 12A–12C and 13A–13C, there is shown trim pieces 60(*a*), 60(*b*), and 60(*c*) that can be made of any material such as plastic, wood or metal to which a resin backing can be applied. Trim pieces 60(*b*) and 60(*c*) include and optional through hole 62.

Figure 11A:
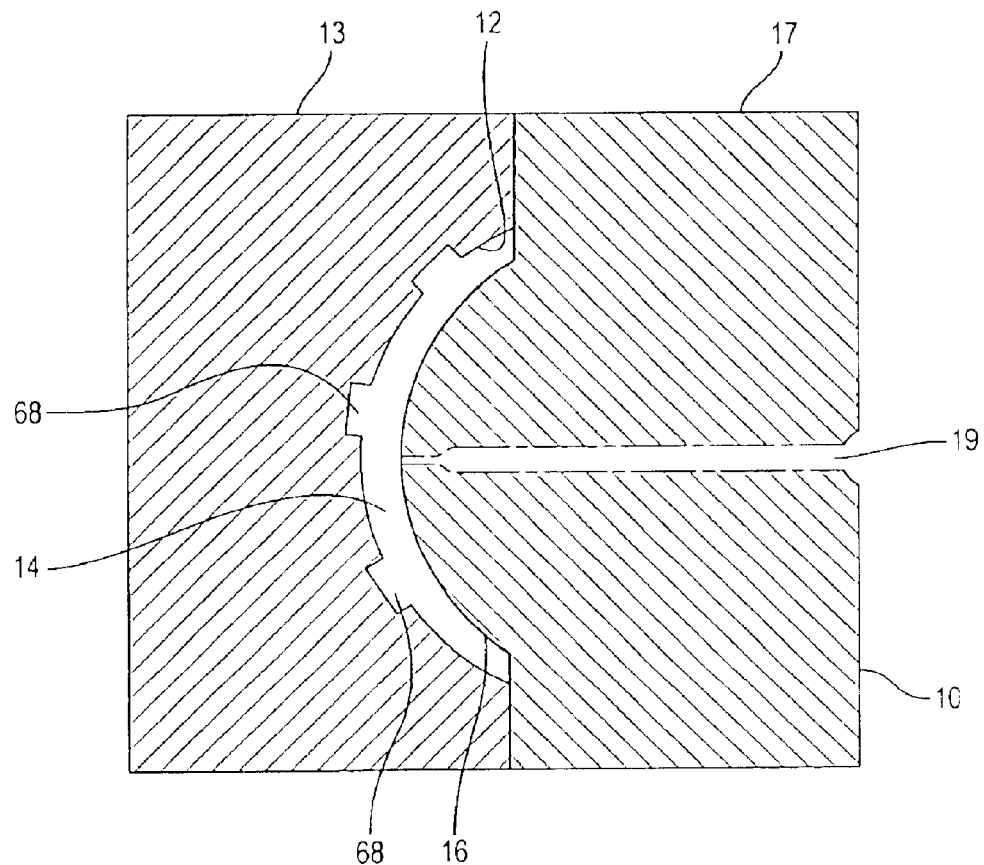
FIG. 11A is a cross section of a mold useful for making a trim piece of this invention and FIGS. 11B and 11C are side and front views of the trim piece manufactured using the mold of FIG. 11A.
Figure 11B:
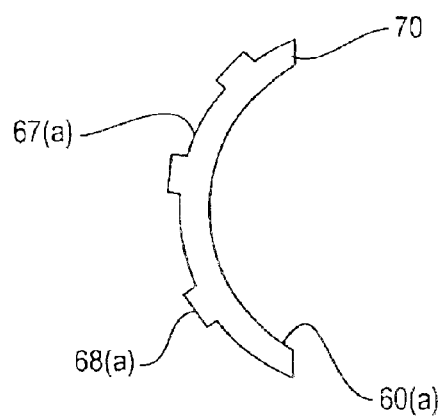
Figure 11C:
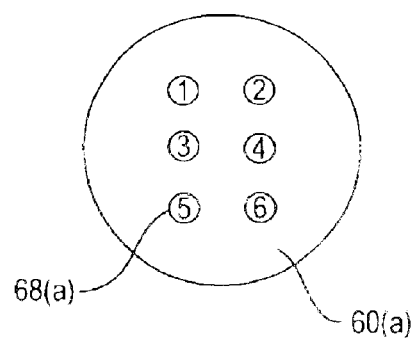

Referring now to FIGS. 11A–11C, there is shown an injection mold 10 including a first piece 13 and a second piece 17 that is combined to form a mold cavity 14. A resin injection port 19 provides a path for injecting resin into mold cavity 14 from outside mold 10. Mold cavity 14, as shown in FIG. 11A, is in the shape of a button or knob that is useful as an automobile trim piece. Mold cavity 14 further includes a plurality of features 68. Feature 68 may be an indentation, knob, buttons, writings, decorations and so forth. FIG. 11B shows trim piece 60(*a*) that is manufactured from injection mold 10 shown in FIG. 11A. Trim piece 60(*a*) is made entirely of a resin material 70. Trim piece 60(*a*) includes an exposed surface 67(*a*) that includes a plurality of feature 68(*a*). Expose surface 67(*a*) and/or feature 68(*a*) may be painted or printed as desired to form a decorated trim piece 60(*a*). FIG. 11C is a front view of a decorated trim piece 60(*a*) including a plurality of features 68(*a*) wherein numerals have been printed onto feature 68(*a*). Trim piece 60(*a*) corresponds to first level trim pieces described above.

Figure 12A:
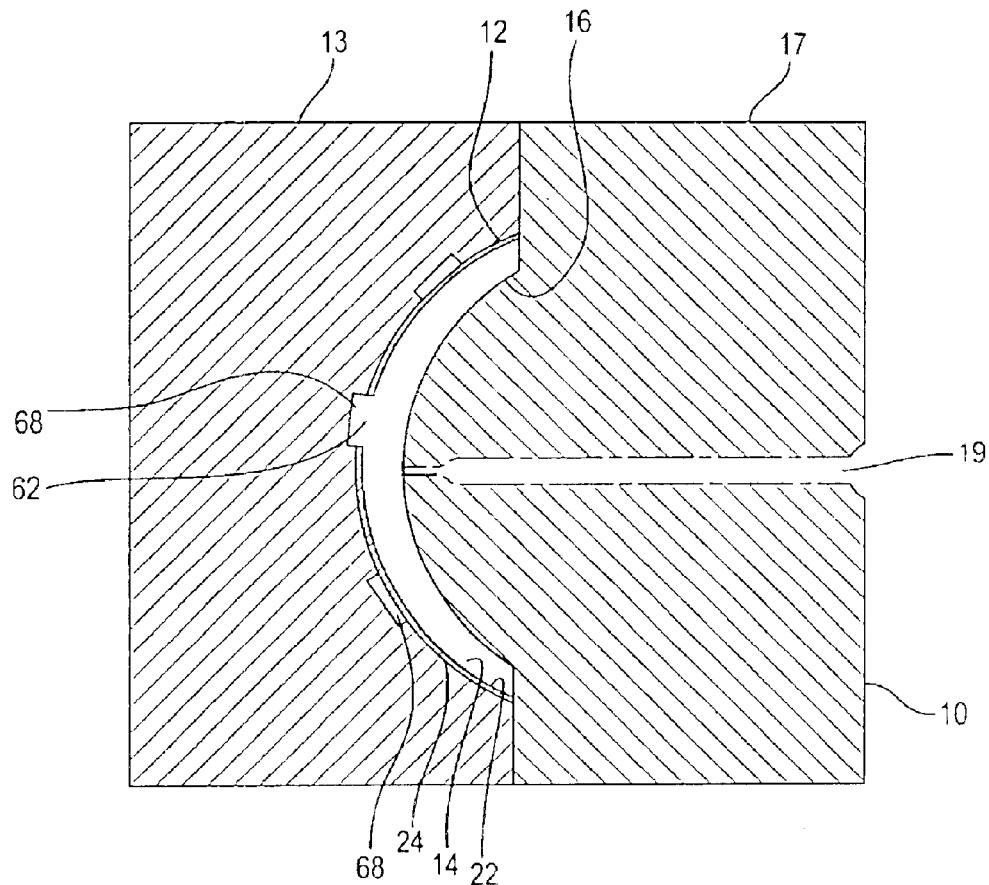
FIG. 12A is a cross section of a mold useful for making a trim piece of this invention including a preformed skin 22 and FIGS. 12B and 12C are side and front views of the trim piece manufactured using the mold of FIG. 12A.
Figure 12B:
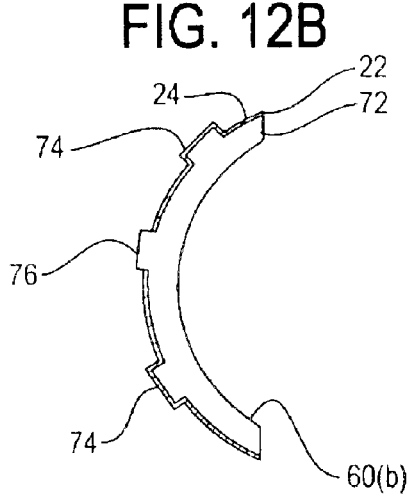
Figure 12C:
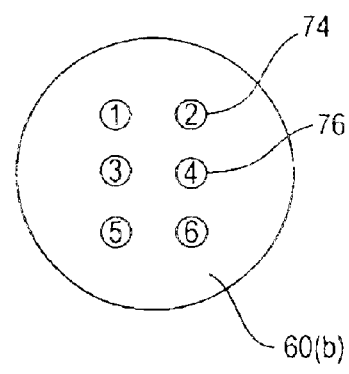

FIGS. 12A–12C depict an alternative trim piece 60(*b*) that may be manufactured by the methods of this invention. Injection mold 10 used to manufacture trim piece 60(*b*) includes a mold cavity 14 that is identical in geometry to the mold cavity used to manufacture trim piece 60(*a*). However, in FIG. 12A, a preformed skin 22 is placed in injection mold 10 such that first surface 24 of pre-formed skin 22 is associated with first surface 12 of injection mold 10. Pre-formed skin 22 as shown in FIG. 12A includes a through hole 62 associated with a feature 68. The pre-formed skin 22 covers the remaining features 68. Injecting resin into mold 10 of FIG. 12B, produces trim piece 60(*b*) shown in FIGS. 12B and 12C. Trim piece 60(*b*) includes a pre-formed skin layer 22 and a resin backing 72. First surface 24 of pre-formed skin 22 may be decorated with numerals, writings, patterns, it may be made of a colored material, or is may included any known type of decoration that is used to decorate trim piece 60(*b*). When resin is injected into the mold of FIG. 12A, the hot resin heats and forces pre-formed skin 22 into features 68 thereby forming pre-formed skin covered features 74. In areas where a through hole 62 is associated with a mold feature 68, the resin fills the feature to form a resin feature 76. It may be desirable to form resin feature 76 for a variety of reasons. The resin used to manufacture resin feature 76 may be clear or semi-opaque thus allowing light to be transmitted from behind trim piece 60(*b*) to illuminate resin feature 76. Alternatively, the resin material used to manufacture trim piece 60(*b*) may be a colored resin that has a color that is different than the color of pre-formed skin 22 thereby providing contrasting colors on the surface of trim piece 60(*b*). Trim piece 60(*b*) is essentially identical in structure to the second level trim pieces described above.

Figure 13A:
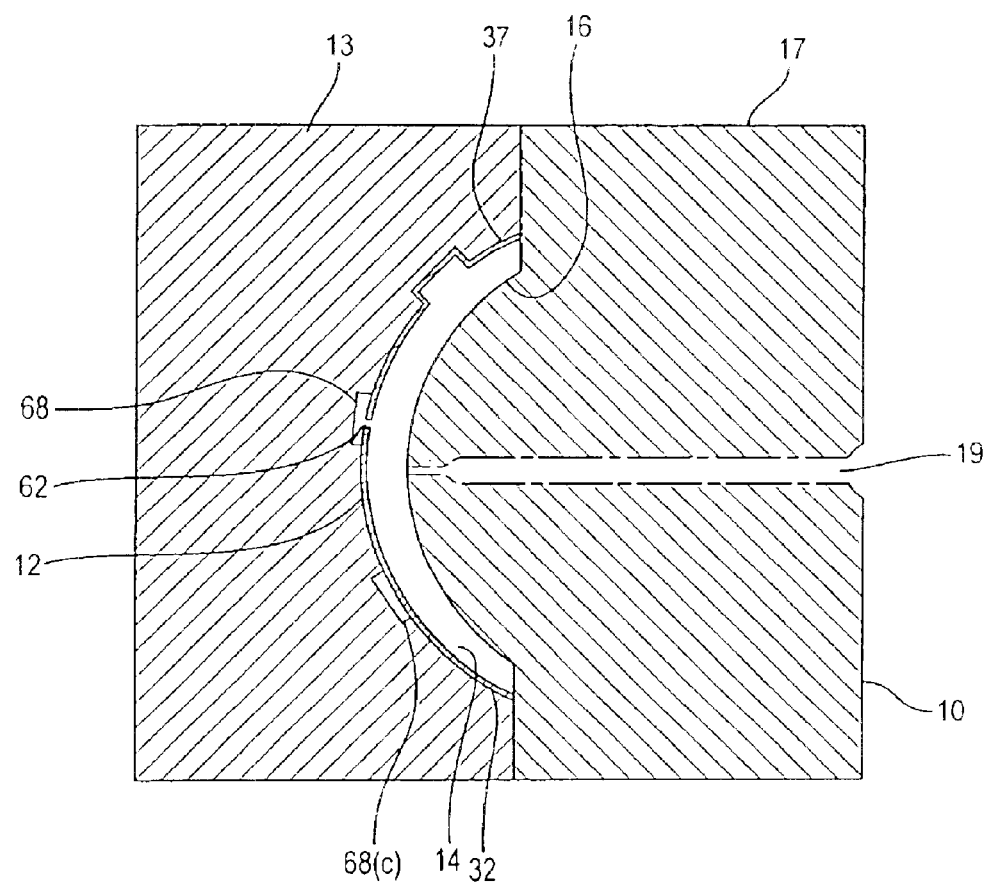
FIG. 13A is a cross section of a mold useful for making a trim piece of this invention including a pre-shaped metal piece.
Figure 13B:
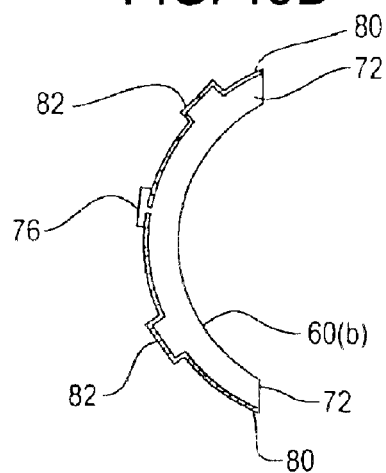
FIGS. 13B and 13C are side and front views of a trim piece manufactured using the mold of FIG. 13A.
Figure 13C:
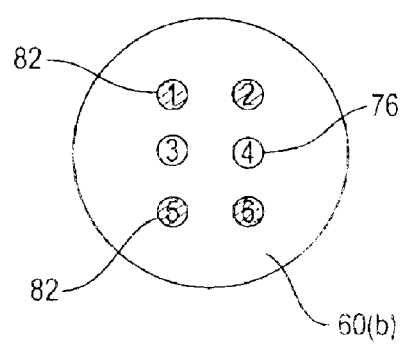

FIG. 13A depicts a mold that is useful for manufacturing trim piece 60(*c*) while FIGS. 13B and 13C depict side and front views of trim pieces 60(*c*) manufactured using the mold of FIG. 13A. The injection mold 10 shown in FIG. 13A is essentially identical to the injection mold shown in FIGS. 12A and 11A. In addition, mold cavity 14 has the same dimensions as the mold cavity 14 of FIGS. 11A and 12A. In FIG. 13A, a pre-shaped metal piece 32 is placed in injection mold cavity 14 such that first surface 37 of pre-shaped metal piece 32 abuts first surface 12 of injection mold 10. Pre-shaped metal piece 32 does not have to conform identically to the shape of first surface 12 which includes a plurality of features 68. In FIG. 13A, pre-shaped metal piece 32 includes an indentation 78 that corresponds to the shape of a feature 68. Additionally, pre-shaped metal piece 32 includes a through hole 62 that is located adjacent to a feature 68. Finally, pre-shaped metal piece 32 includes a portion that covers but does not conform to a feature 68(*c*). Once injection mold of FIG. 13A is closed, a heated resin is injected into mold 10 through resin injection port 19 until cavity 14 is essentially filled with resin to form trim piece 60(*c*) shown in FIGS. 13B and 13C. Trim piece 60(*c*) includes a metal skin 80 and a resin backing 72. In FIGS. 13B and 13C, two of the features are formed metal features 82. Formed metal features 82 may be formed as described above by shaping pre-shaped metal piece 32 to conform with the mold features or formed metal feature 82 may be formed when pressure applied by the injected resin forces pre-shaped metal piece 32 into feature 68(*c*) of FIG. 13A. In addition, trim piece 60(*c*) includes a resin feature 76 formed when the injected resin passed through hole 62 in pre-shaped metal piece 32 to fill feature 68 in mold first surface 12. Trim piece 60(*c*) is essentially identical to the third level trim piece described above.

Figure 14A:
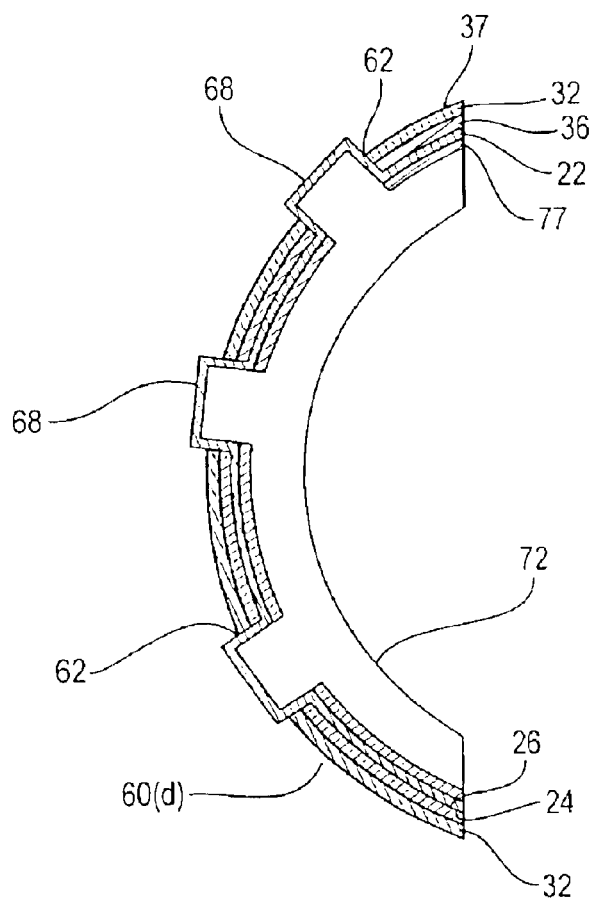
FIGS. 14A and 14B are side and front views of a trim piece 60(d) includes a metal skin 80, an adhesive layer 36, a preformed skin layer 22, a second optional adhesive layer 77 and a resin backing 72.
Figure 14B:
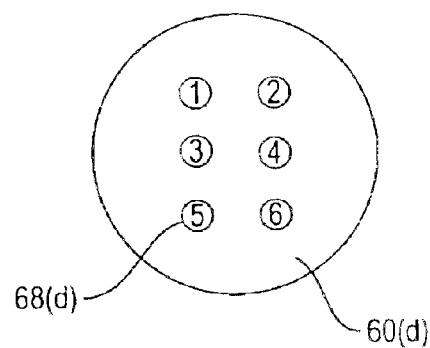

FIGS. 14A and 14B are side and front views of yet another embodiment of a trim piece 60(*d*) that can be manufactured by the methods of this invention. Trim piece 60(*d*) is manufactured using the same mold depicted in FIGS. 11A, 12A and 13A by placing a pre-shaped metal piece 32 including an adhesive layer 36 in injection mold cavity 14 such that first surface 37 of pre-shaped metal piece 32 abuts first surface 12 of injection mold 10. Pre-shaped metal piece 32 includes a plurality of through holes 62 that correspond to features 68 in the final trim piece 60(*d*). After placing preshaped metal piece 32 into the mold, a preformed and optionally predecorated skin 22 including a first surface 24 having one or more features 68 is located in mold 10 so that features 68 protrude through holes 62 and contact first surface 12 of injection mold 10. Second surface 26 of preformed skin 22 may include an adhesive layer 77. Mold 10 is closed and heated resin is injected into mold 10 through resin injection port 19 until cavity 14 is essentially filled with resin to form trim piece 60(*b*) shown in FIGS. 14A and 14B. Trim piece 60(*d*) includes a metal layer 32, an adhesive layer 36, a preformed skin layer 22, a second optional adhesive layer 77 and a resin backing 72. In FIGS. 14A and 14B, each of the features 68 are part of the preformed skin layer 22. Further, as shown in FIG. 14B, skin layer 22 is predecorated so that the final trim piece features 68(*d*) are printed with numerals.

The four levels of trim pieces described above, and trim pieces 60(*a*), 60(*b*), 60(*c*), and 60(*d*) may all be produced using a single injection mold having a mold cavity 14 of identical dimensions. One of the primary differences between the four trim piece levels described above and trim pieces 60(*a*), 60(*b*), 60(*c*), and 60(*d*) is the presence of features on the exposed surface of the trim piece and in particular a feature consisting partially or entirely of resin material.

The preceding description of this invention is intended to be illustrative in nature and is not to be considered as limiting the scope of the invention.

What we claim is:

1. A method for manufacturing at least two types of trim level pieces comprising the steps of:
   a. preparing a mold having a first piece including a first surface, a second piece including a second surface, and at least one injection port located in the second piece wherein the injection port has an outlet associated with the second surface wherein the mold first piece and second piece unite to form an internal cavity; and
   b. preparing at least two different trim level pieces using the mold each by a different method wherein the trim level pieces and the associated method are selected from the group consisting of;
      i. a first trim level piece prepared by injecting a resin into the mold and thereafter removing the cured first level trim piece from the mold and painting at least one surface of the molded trim piece;
      ii. a second trim level piece that is prepared by the further steps comprising: preparing a preformed skin having a first surface and a second surface wherein the preformed skin first surface has a shape complementary to the mold first surface;
      placing the preformed skin into the mold such that the preformed skin first surface contacts the mold first surface;
      closing the mold and injecting resin into the mold through the at least one injection port and into contact with the preformed piece second surface until the internal cavity is filled with resin to form a second trim level piece; and
      removing the second trim level piece from the mold;
      iii. a third trim level trim piece that is prepared by the further steps comprising:
      preparing a shaped metal piece from flat metal stock wherein the shaped metal piece has a first surface and a second surface and wherein the shaped metal piece first surface has a shape complementary to the shape of the mold first surface;
      placing the shaped metal piece into the mold such that the metal sheet first surface is in contact with the mold first surface;
      closing the mold and injecting resin into the mold through the at least one injection port until the mold cavity is filled with resin to form a third trim level piece; and
      removing the third trim level piece from the mold; and
      iv. a fourth trim level piece that is prepared by the further steps comprising;
      preparing a wooden trim piece having a first surface and a second surface wherein the wooden trim piece first surface has a shape that is complementary to the shape of the mold first surface;
      placing the wooden trim piece into the mold such that the wooden trim piece first surface is in contact with the mold first surface;
      closing the mold and injecting a resin into the mold through the at least one injection port and into contact with the wood trim piece second surface until the mold cavity is filled with resin to form a fourth trim level piece; and
      removing the fourth trim level piece from the mold.

2. The method of claim 1 wherein each trim level piece has essentially the same thicknesses at identical locations on the piece.

3. The method of claim 1 wherein the method is used to manufacture at least three types of different trim level pieces.

4. The method of claim 1 wherein an adhesive material is applied to the second surface of the shaped metal piece of the third trim level piece before the shaped metal piece is placed in the mold.

5. The method of claim 4 wherein the adhesive material is applied to the second surface before the flat metal sheet is shaped.

6. The method of claim 1 wherein first surfaces of the preformed skin of the second trim level piece includes a decorated first surface.

7. The method of claim 1 wherein the preformed skin of the second trim level piece has a thickness of from about 0.008 to about 0.030 inches.

8. The method of claim 1 wherein the shaped metal piece of the third trim level piece has a thickness of from about 0.012 to about 0.018 inches.

9. The method of claim 1 wherein a glass filled resin is used to manufacture the third trim level piece.

10. The method of claim 9 wherein a glass filled thermoplastic is used to manufacture the third trim level piece.

11. The method of claim 1 wherein the preformed skin of the second trim level piece is a preformed piece further comprising a layer of cloth and a layer of plastic.

12. A method for manufacturing at least two types of trim level pieces comprising the steps of:
    a. preparing a mold having a first piece including a first surface, a second piece including a second surface, and at least one injection port located in the second piece wherein the injection port has an outlet associated with the second surface wherein the mold first piece and second piece unite to form an internal cavity; and
    b. preparing at least two different trim level pieces using the mold each by a different method wherein the trim level pieces and the associated method are selected from the group consisting of;
       i. a first trim level piece prepared by injecting a resin into the mold and thereafter removing the cured first level trim piece from the mold and painting at least one surface of the molded trim piece;
       ii. a second trim level piece that is prepared by the further steps comprising: preparing a preformed skin having a decorated first surface and
       a second surface wherein the preformed skin first surface has a shape complementary to the mold first surface;
       placing the preformed skin into the mold such that the preformed skin first surface contacts the mold first surface;
       closing the mold and injecting resin into the mold through the at least one injection port and into contact with the preformed piece second surface until the internal cavity is filled with resin to form a second trim level piece; and
       removing the second trim level piece from the mold;
       iii. a third trim level trim piece that is prepared by the further steps comprising:
       preparing a shaped metal piece from flat metal stock wherein the shaped metal piece has a first surface and a second surface and wherein the shaped metal piece first surface has a shape complementary to the shape of the mold first surface;

placing the shaped metal piece into the mold such that the metal sheet first surface is in contact with the mold first surface;

closing the mold and injecting resin into the mold through the at least one injection port until the mold cavity is filled with resin to form a third trim level piece; and removing the third trim level piece from the mold; and iv. a fourth trim level piece that is prepared by the further steps comprising;

preparing a wooden trim piece having a first surface and a second surface wherein the wooden trim piece first surface has a shape that is complementary to the shape of the mold first surface;

placing the wooden trim piece into the mold such that the wooden trim piece first surface is in contact with the mold first surface;

closing the mold and injecting a resin into the mold through the at least one injection port and into contact with the wood trim piece second surface until the mold cavity is filled with resin to form a fourth trim level piece; and removing the fourth trim level piece from the mold wherein at least one of the trim level pieces is a second or third trim level piece and wherein an insert selected from the preformed skin and the preshaped metal piece includes a through hole.

* * * * *